United States Patent [19]

Souda et al.

[11] Patent Number: 4,673,998
[45] Date of Patent: Jun. 16, 1987

[54] MAGNETIC TRANSDUCER HEAD HAVING SERIES CONNECTED MAGNETORESISTANCE EFFECT SENSING ELEMENT WITH HEAD OUTPUT CONNECTED BETWEEN THE SENSING ELEMENTS

[75] Inventors: Yutaka Souda, Ebina; Shigeyoshi Imakoshi, Atsugi; Hideo Suyama, Yokohama; Hiroyuki Uchida; Yasuhiro Iida, both of Atsugi; Tetsuo Sekiya, Yokohama, all of Japan

[73] Assignee: Sony Corporation, Tokyo, Japan

[21] Appl. No.: 546,060

[22] Filed: Oct. 27, 1983

[30] Foreign Application Priority Data

Oct. 29, 1982 [JP] Japan .................................. 57-190181
Oct. 29, 1982 [JP] Japan .................................. 57-190182
Oct. 29, 1982 [JP] Japan .................................. 57-190186

[51] Int. Cl.$^4$ .......................... G11B 5/127; G11B 5/33; G01R 33/02
[52] U.S. Cl. .................................... 360/113; 324/252; 338/32 R
[58] Field of Search ....................... 360/113, 119-120, 360/125-127; 338/32 R; 324/252

[56] References Cited

U.S. PATENT DOCUMENTS 3,949,346  4/1976  Makino et al. ................... 338/32 R
4,058,705  11/1977  Cannon ............................ 360/113 X
4,361,805  11/1982  Narimatsu et al. ........... 338/32 R X Primary Examiner—Stuart N. Hecker
Assistant Examiner—David J. Severin
Attorney, Agent, or Firm—Hill, Van Santen, Steadman & Simpson

[57] ABSTRACT

A magnetic transducer head utilizing magnetoresistance effect having a circuit for applying a constant voltage to outer ends of at least one pair of magnetoresistance effect elements provided in series on a discontinuous portion other than a magnetic gap of a magnetic core forming a magnetic gap and a conductor arrangement for applying bias magnetic fields opposite in polarity to the magnetoresistance effect elements, respectively wherein an output is derived from a connected point between the pair of magnetoresistance effect elements.

4 Claims, 18 Drawing Figures

FIG. 18

MAGNETIC TRANSDUCER HEAD HAVING SERIES CONNECTED MAGNETORESISTANCE EFFECT SENSING ELEMENT WITH HEAD OUTPUT CONNECTED BETWEEN THE SENSING ELEMENTS

BACKGROUND OF THE INVENTION

1. Field of the Invention

The present invention generally relates to a magnetic transducer head utilizing magnetoresistance effect and more particularly is directed to a multichannel magnetic transducer head utilizing magnetoresistance effect.

2. Description of the Prior Art

Figure 1:
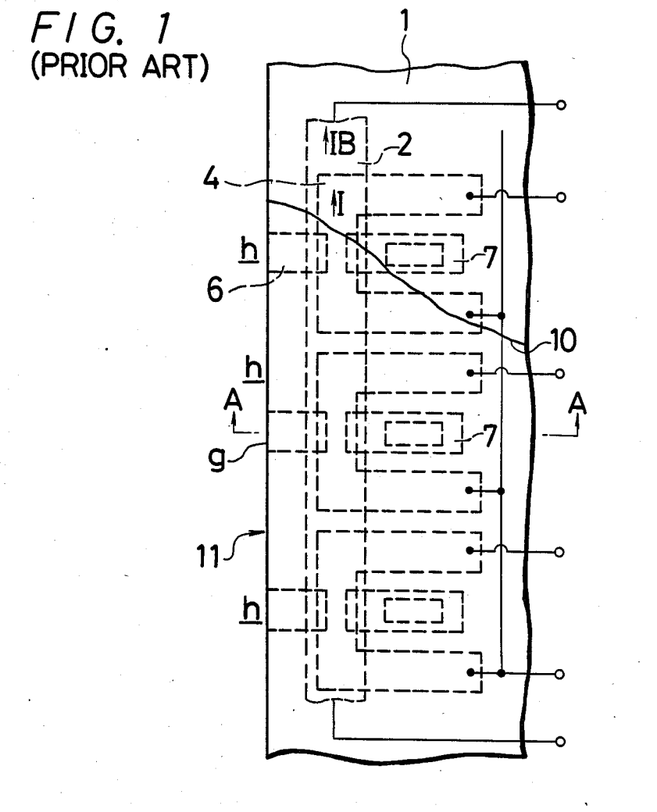
FIG. 1 is an enlarged plan view of a main part of a conventional magnetic transducer head utilizing magnetoresistance effect.
Figure 2:
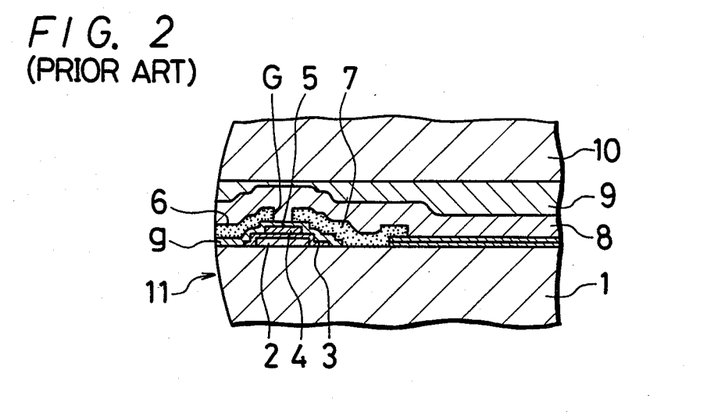
FIG. 2 is a cross-sectional view thereof taken along a line A—A in FIG. 1.

An example of a conventional magnetoresistance effect (hereinafter simply referred to MR) type magnetic reproducing transducer head, particularly a rear type magnetic transducer head in which the MR element thereof is placed at the position backward from the contact surface of the head with a magnetic recording medium is shown in, for example, FIGS. 1 and 2. FIG. 1 is a schematically enlarged plan view of a main part thereof and FIG. 2 is a schematically enlarged cross-sectional view taken along a line A—A in FIG. 1. As shown in FIGS. 1 and 2, on an insulating magnetic substrate 1 made of, for example, ferrite containing Ni - Zn is deposited a band shaped conductor film 2 which constitutes a current path as a bias magnetic field generating means for applying a bias magnetic field to the MR element by electromagnetic induction or the like. On the band shaped conductor film 2 is deposited a thin film MR effect element 4 made of, for example, alloy containing Ni - Fe or Ni - Co or the like through an insulating layer 3. Further, on the MR effect element 4 are deposited a pair of magnetic layers 6 and 7 made of alloy containing Ni - Fe or the like through an insulating layer 5. In this case, the magnetic layers 6 and 7 are located in the direction across the MR effect element 4 and opposed face to face on the MR effect element 4 so as to hold a predetermined spacing G therebetween. The outer end portion of magnetic layer 6 is opposed through at least one of the insulating layers 3 and 5 to the substrate 1, thus forming a magnetic gap g, while the outer end portion of the magnetic layer 7 is contacted with the substrate 1 through windows formed through the insulating layers 3 and 5. The conductor layer 2, the MR effect element 4 and the magnetic layers 6 and 7 are coated with a non-magnetic protective layer 8 on which a protective substrate 10 is bonded by use of an adhesive layer 9. And, over both the substrates 1 and 10 is formed a contact surface 11 with a magnetic recording medium and the magnetic gap g faces on this contact surface 11. The magnetic path which includes the magnetic gap g and the MR effect element 4, namely, the magnetic path of the magnetic substrate 1 - the magnetic gap g - the magnetic layer 6 - the MR effect element 4 - the magnetic layer 7 - the magnetic substrate 1 is formed.

With the configuration thus made, when a predetermined bias magnetic field generated by flowing current $I_B$ through the conductor layer 2 is applied to the MR effect element 4 and a current I is flowed through the MR effect element 4, an electrical signal, namely, output signal due to the resistance change in the MR effect element 4 caused by applying a magnetic flux from a recorded magnetic signal of the magnetic recording medium which is contacted with or opposed to the magnetic gap g is derived from both ends of the MR effect element 4.

Figure 3:
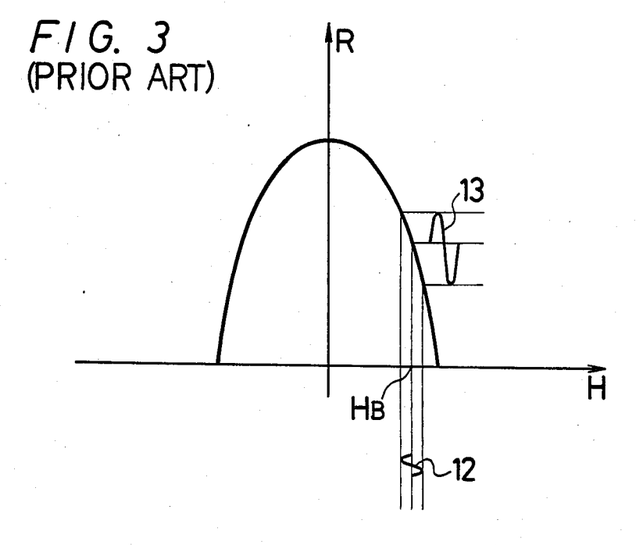
FIG. 3 is a graph showing a mangetoresistance characteristic of a magnetoresistance effect element used in the magnetic transducer head utilizing magnetoresistance effect shown in FIG. 1.
Figure 4:
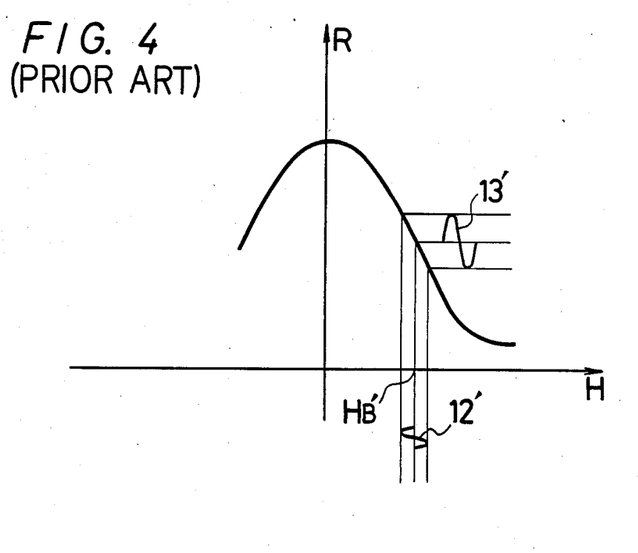
FIG. 4 is a graph of a magnetoresistance characteristic useful for comparison and explanation thereof.

However, such MR effect type magnetic transducer head, particularly the rear type magnetic transducer head in which the magnetic material members are mounted close to the MR effect element has such a problem that its magnetoresistance characteristic is nonlinear. Namely, in the magnetic transducer head of this kind, magnetic field H versus resistance R characteristic of the MR effect element 4 indicates a parabola as shown in FIG. 3. Accordingly, if, as shown in FIG. 3, the magnetic signal as indicated by reference numeral 12 is applied to the MR effect element 4 under the state that the bias magnetic field $H_B$ is applied to this MR effect element 4, the output signal provided by the resistance change in the MR effect element 4 becomes asymmetrical and distorted signal as shown by reference numeral 13. In this connection, the magnetoresistance characteristic when the magnetic material members are not close to the MR effect element has the extended skirt portion as shown in FIG. 4. Since the characteristic partially includes a portion having superior linearity, under a predetermined bias magnetic field $H_B'$, it is possible to obtain an output signal 13' which has no distortion and superior symmetry against a magnetic signal 12'. This is because of the influence of demagnetizing field generated at both sides of the MR effect element. While the magnetic transducer head such as rear type configuration as shown in FIGS. 1 and 2 in which the magnetic layers 6 and 7 are placed close to both side end faces of the MR effect element 4, the influence of such demagnetizing field upon the magnetoresistance characteristic is small.

As can also be seen from FIG. 3, when operating to the right of the vertical axis ($+H_B$), addition of a further positive magnetic field or a positive increase in $H_B$ moves the operating point on the curve to the right, thus causing a decrease in resistance. When operating to the left of the vertical axis ($-H_B$), the same further positive magnetic field or positive increase in $-H_B$ still moves the operating point to the right, but causes an increase in resistance.

As a magnetic transducer head utilizing magnetoresistance effect which can remove the nonlinear component of the magnetoresistance characteristic in the MR effect element, there is proposed such one in which MR effect elements are constituted in a differential type configuration.

Figure 5:
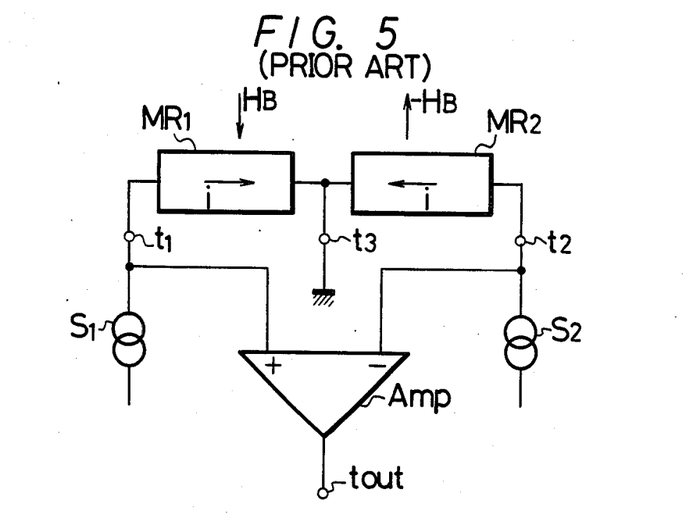
FIG. 5 is a constructional view of a conventional magnetoresistance effect type magnetic transducer head of differential type which is driven by constant currents.
Figure 6:
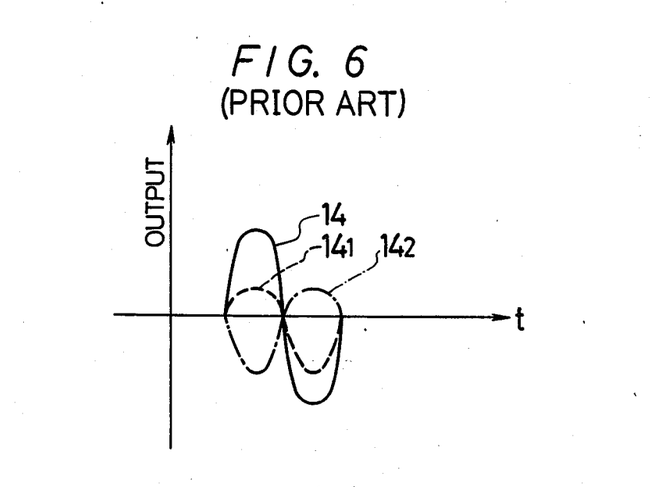
FIG. 6 is a waveform diagram showing the output thereof.

As shown in FIG. 5, the differential type MR magnetic transducer head comprises two MR effect elements $MR_1$ and $MR_2$ of which respective ends opposite to each other are connected to common terminal $t_3$ and other respective ends are led out to terminals $t_1$ and $t_2$. Terminals $t_1$ and $t_2$ are respectively connected to independent constant current sources $S_1$ and $S_2$ and also connected to input terminals of a differential amplifier Amp. A common terminal $t_3$ is supplied with a predetermined potential, for example, a ground potential. The MR effect elements $MR_1$ and $MR_2$ are respectively supplied with constant currents i in the direction opposite to each other, and also supplied with bias magnetic fields $H_B$ which are in the direction perpendicular to the constant currents i and opposite to each other. According to the differential type magnetic transducer head with this construction, when the MR effect elements $MR_1$ and $MR_2$ are commonly supplied with an input signal of magnetic flux from a magnetic recording medium, output signals $14_1$ and $14_2$ having an opposite polarity as shown in FIG. 6 are derived from the MR effect elements $MR_1$ and $MR_2$ to the amplifier Amp so that from the output terminal $t_{out}$ of the differential amplifier Amp appears a signal 14 having a positive and negative symmetry provided by composing these signals, namely, the nonlinear components being cancelled out.

In accordance with the differential type MR magnetic transducer head of such constant current type, the nonlinear components of the magnetoresistance characteristic of the MR effect elements $MR_1$ and $MR_2$ can be cancelled out. Hence it is possible to obtain a reproduced signal excellent in symmetry and with no distortion. The magnetic transducer head of this kind, however, requires three terminals $t_1$ to $t_3$ to be led out, two independent signal lines connected to the diffrential amplifier Amp and two independent constant current sources $S_1$ and $S_2$. Therefore, when this magnetic transducer head is applied to the multichannel magnetic transducer head, if the number of channels is taken as n (n is a positive integer), this multichannel magnetic transducer head requires at least $2n+1$ (in number) terminals and further requires at least 2n (in number) constant current sources. Moreover, because of the constant current driving, the above multichannel magnetic transducer head consumes large power and the circuit thereof becomes large. Thus, the above differential type magnetic transducer head is not suitable for the multichannel magnetic transducer head having, for example, n selected in a range from 10 to 50.

To remove such defects, there is proposed a magnetic transducer head in which a pair of MR elements are coupled in series, a constant voltage is applied across both outer ends thereof and an output is differentially derived from the connected point between both the elements.

According to the differential type magnetic transducer head of such constant voltage driving system, in the same way as in the afore-mentioned constant current driving system, it is possible to cancel out the second-order harmonic components. The sensitivity under the same power consumption is reduced to the half that of the constant current driving system, however, S/N (signal-to-noise) ratio and signal power under the same power consumption are equal to those of the constant current driving system. And, as compared with the differential type MR magnetic transducer head of the constant current type, it is not necessary to provide two independent constant current sources for each channel and to lead out a large number of terminals and their wirings. Thus, there is a great advantage for the multichannel type magnetic transducer head that the configuration thereof can be simplified.

As such MR magnetic transducer head of the constant voltage driving type, there is proposed MR magnetic transducer head of the self-biasing type. The MR magnetic transducer head of the self-biasing type configuration is disclosed in the public unexamined Japan patent application No. 23920/1977 or proposed as so-called barber pole type. In these magnetic transducer heads, the direction of the current path through each MR element has a predetermined angle against the direction of easy magnetization of each element so that the current flowing through the element allows the bias magnetic field having a predetermined angle against the current path to occur. In the MR magnetic transducer head of, for example, barber pole type, with the inclination relative to the direction of easy magnetization along the longitudinal direction of the thin film MR element, namely, just like the obliquie patterns in the barber pole, a plurality of good conductive band lines made of, for example, Au are placed in parallel to hold a predetermined spacing therebetween. In this case, if the MR element of the multichannel magnetic transducer head is reduced in size in order to reduce the width of the channel pitch, it is necessary to reduce the spacing between the conductor band lines. In association therewith, the substantial resistance of the MR element becomes small, resulting in various problems such as difficult handling of the output signal.

Furthermore, in the thin film magnetic transducer head of this kind as shown in FIGS. 1 and 2, when a human body, for example, a hand touches the terminal of the magnetic transducer head or the magnetic layer or core 6 which faces to the contact surface 11 with the magnetic recording medium, the discharge of static electricity accumulated in the human body or the induced voltage destroys each of the insulating layers 3 or 5 between the MR element 4 and the bias conductor member 2, between the magnetic cores 6, 7 and the MR element 4, and further between the bias conductor member 2 and the magnetic cores 6, 7 and the breaking of wires is caused in each portion of the thin film MR element and the like thus producing no good products or troubles.

OBJECTS AND SUMMARY OF THE INVENTION

Accordingly, it is an object of the present invention to provide a multichannel magnetic transducer head utilizing magnetoresistance effect which can remove the above defects inherent in the conventional magnetic transducer head.

It is another object of the present invention to provide a multichannel magnetic transducer head utilizing magnetoresistance effect which can simplify the configuration thereof by providing two current supply terminals commonly in all channels to thereby apply a predetermined bias magnetic field to each MR element of each channel.

According to one aspect of the present invention, there is provided a magnetic transducer head utilizing magnetoresistance effect comprising:

a magnetoresistance effect element provided on a discontinuous portion other than a magnetic gap of a magnetic core forming a magnetic gap; and a bias conductor member for applying a bias magnetic field to said magnetoresistance effect element, wherein said magnetic core, magnetoresistance effect element and bias conductor member are electrically connected together.

According to another aspect of the present invention, there is provided a magnetic transducer head utilizing magnetoresistance effect comprising:

means for applying constant voltages to both ends of at least pair of magnetoresistance effect elements provided in series on a discontinuous portion other than a magnetic gap of a magnetic core forming a magnetic gap; and means for applying bias magnetic fields each having an opposite polarity to said pair of magnetoresistance effect element, wherein an output is derived from connected point between said pair of magnetoresistance effect elements.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 7:
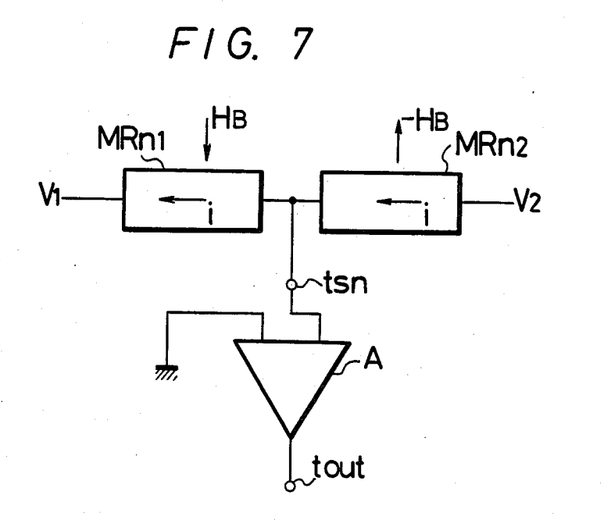
FIG. 7 is a constructional view illustrating a fundamental structure of a magnetic transducer head according to the present invention.

Now, the present invention will hereinafter be described in detail with reference to the attached drawings. FIG. 7 is a constructional diagram showing a fundamental structure of a magnetic transducer head according to the present invention. In the present invention, as shown in FIG. 7, there are provided a pair of magnetoresistance effect elements (hereinafter simply referred to as MR elements) $MR_{n1}$ and $MR_{n2}$ connected in series for each channel. The pair of MR elements $MR_{n1}$ and $MR_{n2}$ are supplied at their ends with constant voltages $V_1$ and $V_2$. Also, the MR elements $MR_{n1}$ and $MR_{n2}$ are applied with bias magnetic fields $H_B$ and $-H_B$ which each have an inclination of a predetermined angle, for example, 90° relative to each current i path therethrough, and are the same in magnitude as one other but opposite in polarity. Also, an output terminal $t_{sn}$ is led out from the series connection point between the MR elements $MR_{n1}$ and $MR_{n2}$ and connected to an amplifier A from which is derived an output.

Figure 8:
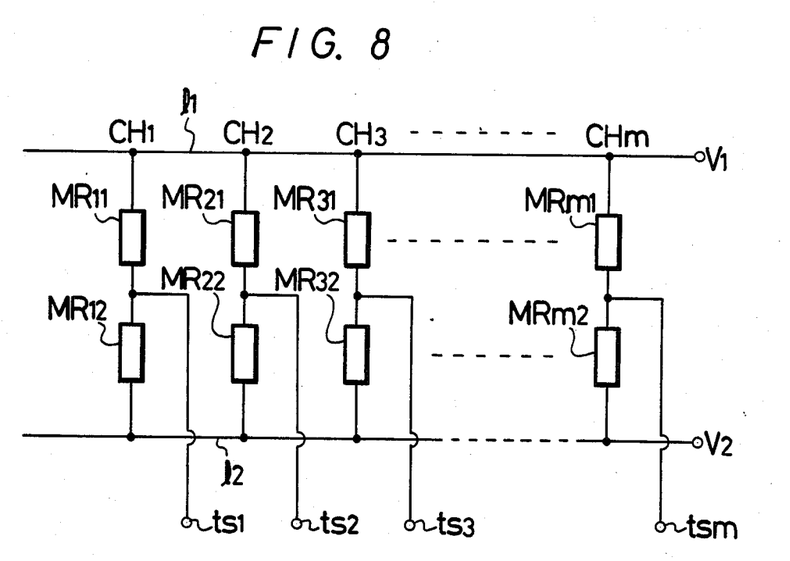
FIG. 8 is an electrical connection diagram of an embodiment of the magnetic transducer head according to the present invention.

FIG. 8 shows an example of electrical connection pattern of a multichannel magnetic transducer head utilizing magnetoresistance effect according to the present invention. Regarding each of channels $CH_1$, $CH_2$, $CH_3$ ... $CH_m$, there are provided a pair of MR elements $MR_{n1}$ and $MR_{n2}$ ($MR_{11}$ and $MR_{12}$, $MR_{21}$ and $MR_{22}$, $MR_{31}$ and $MR_{32}$ ... $MR_{m1}$ and $MR_{m2}$) shown in FIG. 7. From the connected point between each pair of MR elements is led out a terminal $t_{sn}$ ($t_{s1}$, $t_{s2}$, $t_{s3}$ ... $t_{sm}$). The outer ends of the pair of the MR elements $MR_{n1}$ and $MR_{n2}$ in the respective channels $CH_n$ are connected in parallel to the common power supply lines $l_1$ and $l_2$ to which predetermined voltages $V_1$ and $V_2$ are applied.

Figures 9, 10:
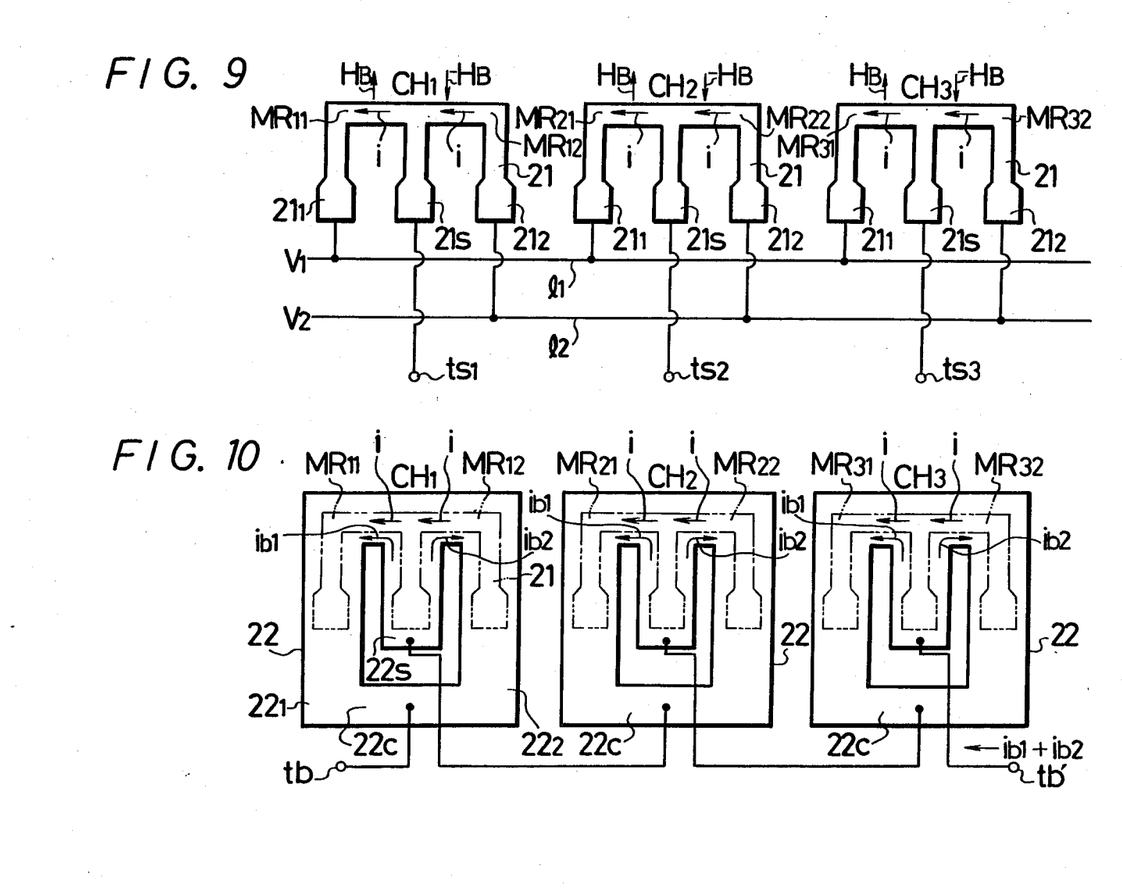
FIG. 9 is a schematically constructional diagram of an example of magnetoresistance effect elements used in the magnetic transducer head according to the present invention.
FIG. 10 is a constructional diagram of an example of bias conductor members in the bias magnetic field generating means used in the magnetic transducer head according to the present invention.

As shown in FIG. 9 each of the MR elements $MR_{n1}$ ($MR_{11}$, $MR_{21}$ ... $MR_{m1}$) and $MR_{n2}$ ($MR_{12}$, $MR_{22}$ ... $MR_{m2}$) is formed by a metal thin film of E-shape pattern having magnetoresistance effect and made of, for example alloy 21 containing Ni - Fe or Ni - Co. Both of outer leg portions $21_1$ and $21_2$ thereof are connected to the lines $l_1$ and $l_2$ to which the voltages $V_1$ and $V_2$ are applied. From the center leg portion $21_s$ is led out the terminal $t_{sn}$ ($t_{s1}$, $t_{s2}$ ... $t_{sm}$) which derives the signal. Then, the MR elements $MR_{n1}$ and $MR_{n2}$ are respectively formed between the leg portions $21_1$, $21_s$ and the leg portions $21_s$ and $21_2$ on the metal thin film 21. Accordingly, since the MR elements $MR_{n1}$ and $MR_{n2}$ for each channel $CH_n$ are connected in series, the current i is flowed therethrough in the same direction. The E-shape pattern thin film 21 is formed symmetrical to the center line which passes through the center of the center leg portion $21_s$ so that both the MR elements $MR_{n1}$ and $MR_{n2}$ have the same magnetic characteristic.

These MR elements $MR_{n1}$ and $MR_{n2}$ are applied from the outside with the bias magnetic fields $H_B$ and $-H_B$ each having an inclination of a predetermined angle not being coincident with the current flowing direction, for example, in the direction perpendicular thereto and having the opposite polarity. As a means for applying the bias magnetic fields having the opposite polarity to the pair of the MR elements $MR_{n1}$ and $MR_{n2}$, particularly the present invention employs the electromagnetic induction system. As an example of this means, for example, shown in FIG. 10, along the MR thin film 21 which forms the pair of MR elements $MR_{n1}$ and $MR_{n2}$, laminated through an insulating layer is a bias conductor member 22 of, for example, similar E-shape pattern made of conductor layer having a low electric resistance. This bias conductor member 22 is formed to have a coupled portion $22_c$ which connects both side leg portions $22_1$ and $22_2$ of its E-shape pattern with each other. In the adjoining channels, the center leg portion $22_s$ of E-shape pattern, namely, the portion corresponding to the connected point between the pair of MR elements $MR_{n1}$ and $MR_{n2}$ is connected to the coupled portion $22_c$ of both side leg portions in the conductor pattern 22 of the succeding channel. Between the coupled portion $22_c$ of both side leg portions in the E-shape pattern of one channel $CH_1$ provided at outermost position and the center leg portion $22_s$ of the channel $CH_m$ similarly provided at the other outermost position connected a current source (not shown) which generates the bias magnetic field. The bias conductor member 22 is located in parallel to the pair of the MR elements $MR_{n1}$ and $MR_{n2}$, while in series between the adjoining channels. From both ends thereof are led out bias magnetic field generating current source terminals tb and tb'. When a bias current $i_{b1}+i_{b2}$ for generating magnetic field is supplied between both the terminals tb and tb' from the current source which generates the bias magnetic field, it is possible to apply the bias magnetic fields $H_B$ and $—H_B$ opposite in polarity to the pair of MR elements $MR_{n1}$ and $MR_{n2}$.

In the present invention, since the bias conductor member 22 is provided in parallel to the pair of the MR elements $MR_{n1}$ and $MR_{n2}$ and also sequentially in series to the channels adjoining to each other, only two terminals tb and tb' connected to the common power source are used as the bias conductor terminals regarding all the channels thus the configuration thereof being simplified.

Figure 11:
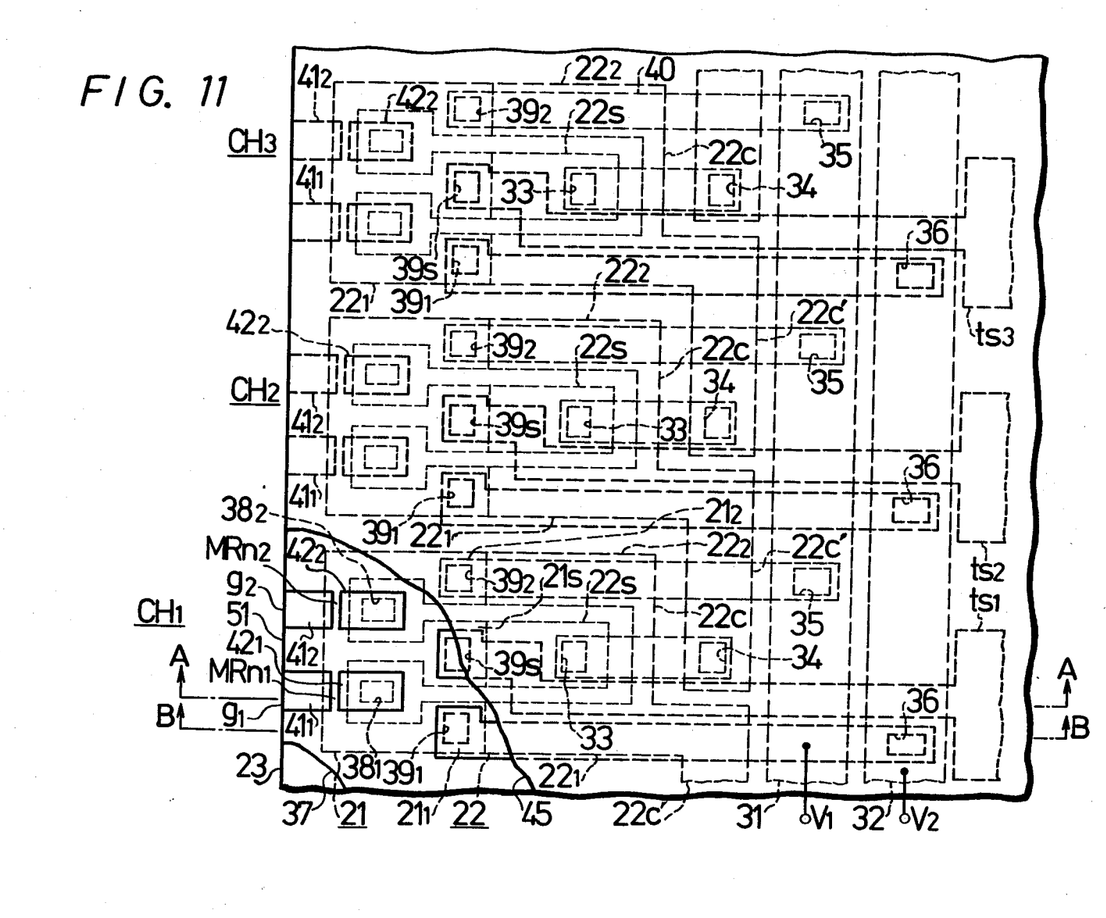
FIG. 11 is a schematically enlarged plan view illustrating a practical structure of a main part of an embodiment of the magnetic transducer head according to the present invention.
Figure 12:
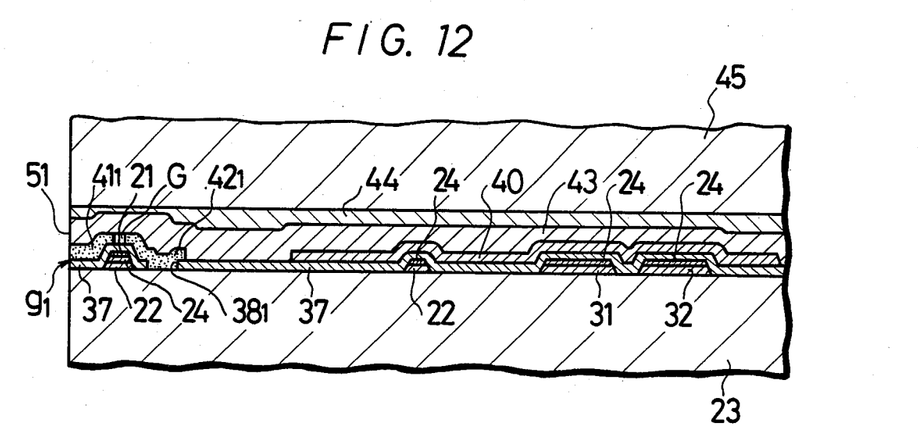
FIGS. 12 and 13 are respectively enlarged cross-sectional views thereof taken along lines A—A and B—B in FIG. 11.
Figure 13:
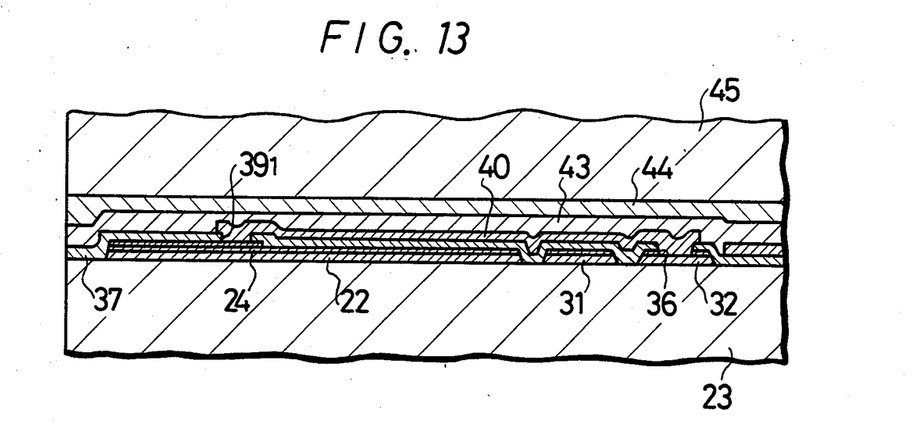

The practical structure of the above multichannel MR type magnetic transducer head according to the present invention will be described with reference to FIGS. 11 to 13. FIG. 11 is a schematically enlarged plan view showing a main part of an example of the multichannel MR type magnetic transducer head according to the present invention, FIG. 12 is an enlarged cross-sectional view thereof taken along a line A—A in FIG. 11, and FIG. 13 is a like enlarged cross-sectional view thereof taken along a line B—B in FIG. 11. Reference numeral 23 designates a magnetic substrate used as an under core made of, for example, ferrite containing Ni-Zn on which the bias conductor members 22 and conductor members 31 and 32 which construct the power supply lines $l_1$ and $l_2$ for applying the constant power supply voltages $V_1$ and $V_2$ are deposited. An MR thin film 21 which forms the pair of MR elements $MR_{n1}$ and $MR_{n2}$ ($MR_{11}$ and $MR_{12}$, $MR_{21}$ and $MR_{22}$, ... $MR_{m1}$ and $MR_{m2}$) for each channel ($CH_1$, $CH_2$, ... $CH_m$) is deposited thereon through an insulating layer 24 with a predetermined pattern. These bias conductor members 22, insulating layer 24 and the MR thin film 21 are deposited in turn on the magnetic substrate 23 over the whole area by vacuum evaporation, sputtering and the like and then put into the pattern. In this case, in order to increase the bonding strength of the conductor layer to the magnetic substrate 23, if necessary, for example, a Cr layer as under layer is deposited thereon over the whole area to have a thickness of, for example, 3000 Å by vacuum evaporation, sputtering or the like. A conductive layer, for example, Au metal layer which forms the bias conductor member 22 and the power supply conductor members 31 and 32, for example, Au metal layer are similarly deposited thereon by vacuum evaporation, sputtering and the like on which $Si_3N_4$ or $Al_2O_3$ insulting layer 24 is deposited over the whole area thereof. Further, a metal thin film made of, for example, alloy containing Ni - Fe or Ni - Co for forming the MR thin film 21 is similarly deposited thereon over the whole area by vacuum evaporation, sputtering or the like. After that, through the MR thin film layer 21, the insulating layer 24 provided thereunder, the conductive layer provided thereunder and the under layer provided thereunder, other portions than the MR thin film of E-shape pattern which forms the pair of MR elements $MR_{n1}$ and $MR_{n2}$ for each channel, the similar bias conductor members 22, the power supply conductor members 31 and 32 for the constant voltages $V_1$ and $V_2$ and the terminal portions are selectively etched away in turn with respect to each layer by the use of, for example, the same etching mask or the upper layer as the mask. In this case, such an etching is desired that the etched portions become trapezoidal shape in cross section in which the width thereof becomes narrower as it comes closer to the upper layer. Next, only the MR thin film layer is selectively etched thereby to form the aforementioned thin film 21 of E-shape pattern. These etching processess can be carried out by wet etching method or dry etching method, namely, for example, chemical etching method or ion etching method and the like. Thus, the MR thin film 21 of E-shape pattern which forms the pair of MR elements $MR_{n1}$ and $MR_{n2}$ is formed under which the bias conductor member 22 insulated by the insulating layer 24 and the power supply conductor members 31 and 32 are formed. In the same way as in FIG. 10, in the bias conductor member 22 there is formed an extended portion $22_c'$ which is provided by extending the coupled portion $22_c$ which connects both of the outside leg portions $22_1$ and $22_2$, up to the position faced to the center leg portion $22_s$ of each conductor member 22 in the adjoining channel, for example, the preceding channel $CH_{n-1}$ across the connecting portion $22_c$. Moreover, the power supply conductor members 31 and 32 can be formed as the band-shaped patterns extending along the array direction of respective channels $CH_n$.

Next, through the insulating layers 24 on the end portion of the center leg portion $22_s$, the extended portion $22_c'$ of the bias conductor member 22 and on the portions of the power supply conductor members 31 and 32 corresponding to the channels $CH_n$ are bored contact windows 33 to 36 which are used to contact wiring conductor layers which will be described later.

Then, a non-magnetic insulating layer 37 made of, for example, $SiO_2$ and having etching property different from that of the insulating layer 24 is deposited thereon over the whole area of these patterns by a well-known technique. The thickness of this insulating layer 37 is selected to be such one which restricts the magnetic gap length, for example, 0.3 μm in the contact surface with the magnetic recording medium, which will be described later. This insulating layer 37 is selectively etched by, for example, wet etching method or dry etching method such as plasma etching or the like to bore windows $38_1$ and $38_2$ at the positions adjoining the pair of MR elements $MR_{n1}$ and $MR_{n2}$ between the leg portions of the E-shape type MR thin film 21 for each channel, thus the surface of the magnetic substrate 23 being partially exposed. Moreover, windows 39, $39_2$ and $39_s$ are bored through the end portions of the leg portions $21_1$, $21_2$ and $21_s$ on the MR thin film $21_1$, $21_2$ and $21_s$ partially to the outside. Furthermore, at the same time when these windows $39_1$, $39_2$ and $39_s$ are bored therethrough, the insulating layers 37 coated on the windows 33 to 36 bored previously are etched away and thereby the windows 33 to 36 are exposed to the outside again.

Subsequently, a magnetic layer made of alloy containing Ni - Fe or the like is deposited thereon by vacuum evaporation, sputtering or the like over, the whole area including not only the inside of the windows $38_1$ and $38_2$ but also the positions transversing the pair of MR elements $MR_{n1}$ and $MR_{n2}$. The above magnetic layer is selectively etched away by the wet etching method or dry etching method similarly as mentioned before so that in association with the MR elements $MR_{n1}$ and $MR_{n2}$ a pair of magnetic layers $41_1$, $41_2$ and $42_1$, $42_2$ are bridged across both side edges of the MR elements through the insulating layers 37 so as to be placed face to face, holding a predetermined spacing G therebetween. The width of each of the magnetic layers $41_1$, $41_2$ and $42_1$, $42_2$ with which overlap the side edge of the MR element is selected, for example, to be approximately 1 μm when the width of the MR element is selected to be 5 μm. One pair of magnetic layers $42_1$ and $42_2$ are partially contacted to the magnetic substrate 23 through the windows $38_1$ and $38_2$ bored through the insulating layers 37. On the other hand, except the portions where the magnetic layers $41_1$, $41_2$ and $42_1$, $42_2$ on the magnetic substrate 23 exist, for example, the conductive layer 40 is deposited over at least the windows 33 to 36 and $39_1$, $39_2$ and $39_s$ thoroughly, which then is selectively etched away to be removed, leaving the wiring conductive portions between the windows $39_1$ and 36, the windows $39_2$ and 35 and the windows 33 and 34 and further the wiring portion used to lead the external output terminal $t_{sn}$ through the window $39_s$. And, one terminal tb connecting to the bias source is led out from the extended poriton 22hd c' on the bias conductor member 22 in the channel $CH_1$ of the one outermost end, while the other terminal tb' connecting to the bias source is led out from the center leg portion $22_s$ of the channel $CH_m$ of the other outermost end.

A protective layer 43 made of, for example, $SiO_2$ or the like is deposited thereon over the whole area including these patterns to which an upper protective substrate 45, for example, glass plate or the like is bonded by using an inorganic adhesive layer such as glass or organic adhesive layer 44. And, over the area from the protective substrate 45 to the magnetic substrate 23, the outer end side exposed magnetic layers $41_1$ and $41_2$ corresponding to the MR elements of the channels $CH_n$ are polished thereby to form a contact surface 51 with the magnetic recording medium. As described above, facing to the contact surface 51 with the magnetic recording medium, magnetic gap $g_1$, $g_2$ having a gap length restricted by the thickness of the non-magnetic insulating layer 37 are formed between the magnetic substrate 23 and the magnetic layers $41_1$, $41_2$. According to the construction thus made, the multichannel magentic transducer head is made in which a pair of closed magnetic paths, each including the magnetic gaps $g_1$, $g_2$ and the MR elements $MR_{n1}$, $MR_{n2}$ are respectively formed through the magnetic layers $41_1$, $42_1$ and the magnetic substrate 23 and through the magnetic layers $41_2$, $42_2$ and the magnetic substrate 23.

The multichannel MR type magnetic transducer head according to the present invention is not limited to the aforesaid examples. When the conductive layer comprising each bias conductor member 22 and the MR thin film layer comprising the MR thin film 21 are laminated to each other over the whole area through the insulating layer, which then are patterned, the MR thin film 21 of, for example, the E-shape pattern composing each MR element and the bias conductor member 22 are never displaced from each other in position. Besides, since they are ensured electrically insulating from each other by the insulating layer 24, the bias magnetic field can be applied to the MR elements $MR_{n1}$ and $MR_{n2}$ surely and efficiently. Moreover, since the insulating layers 24 are removed at the magnetic gap portions $g_1$ and $g_2$, the gap length of the magnetic gaps $g_1$ and $g_2$ are restricted by only the thickness of the upper insulating layers 37. Thus, it is possible to determine the gap length with ease. In this case, if both of the insulating layers 24 and 37 are made of, for example, $Al_2O_3$ or $Si_3N_4$ and $SiO_2$, each having different etching property, there is an advantage that even when the upper insulating layer 37 made of $SiO_2$ is selectively etched by the plasma etching process, substantially no etching effect appears on the lower insulating layer 24 made of $Al_2O_3$ or $Si_3N_4$.

While in the above example a pair of MR elements are provided for each channel, it is possible to provide a plurality of pairs of MR elements for each channel. Even when the end face of the MR element is faced to the contact surface with the magnetic recording medium, the magnetoresistance characteristic of each MR element similarly indicates the parabola, if the magnetic members are placed close to each other across the MR element. Thus, in the above example according to the present invention the MR magnetic transducer head is the rear type, however the present invention can be applied to the MR magnetic transducer head of so-called shield type.

In the above example, the magnetic substrate 23 has the insulating property. While, when the magnetic substrate 23 has conductive property, the magnetic substrate 23 is coated with the insulating layer and thereon the bias conductor member 22 and so on are formed in turn.

As set forth above, in the present invention, since the bias magnetic field generated by flowing the current through the bias conductor member 22 is applied to the MR elements $MR_{n1}$ and $MR_{n2}$ from the outside of the MR element, the influence due to the self-biasing effect by the current i flowing through the MR element itself causes the strength of the bias magnetic field being applied to the pair of MR elements $MR_{n1}$ and $MR_{n2}$ for each channel to be substantially ununiform. As a result, the cancelling of the nonlinear components may sometimes be insufficient. Therefore, in this case, in view of the self-biasing effect, it is desired that the bias magnetic fields from the outside are made different for the respective MR elements $MR_{n1}$ and $MR_{n2}$. As that example, the bias currents $i_{b1}$ and $i_{b2}$ themselves flowing along the respective MR elements $MR_{n1}$ and $MR_{n2}$ in the bias conductor member 22 which generate the external bias magnetic field are selected to be the values taking the self-biasing influence of the MR elements $MR_{n1}$ and $MR_{n2}$ into account. Namely, as will be clear from FIG. 10, the direction of the current i flowing through one MR element $MR_{n1}$ and that of the current $i_{b1}$ flowing through the path between the leg portions $22_s$ and $22_1$ of the bias conductor member 22 which applies the external bias magnetic field thereto are coincident with each other, while the direction of the current i flowing through the other MR element $MR_{n2}$ and that of the current $i_{b2}$ flowing through the path between the leg portions $22_s$ and $22_2$ of the bias conductor member 22 are opposite to each other. In other words, regarding one MR element $MR_{n1}$, the direction of the self-biasing magnetic field and that of the bias magnetic field applied from the outside thereof are the same so that the strength of the bias magnetic field is increased by the self biasing. While, regarding the other MR element $MR_{n2}$, the direction of the self biasing magnetic field and that of the bias magnetic field applied from the outside thereof are opposite so that the strength of the bias magnetic field is decreased by the self bias. To be more concrete, magnetic fields $H_1$ and $H_2$ which will substantially be applied to both of the MR elements $MR_{n1}$ and $MR_{n2}$ are given as $$H_1 = H_{B1} + H_{MR1} \\ H_2 = H_{B2} - H_{MR2} \quad (1)$$

where $H_{B1}$ and $H_{B2}$ represent the strength of the external bias magnetic fields being applied to the respective MR elements $MR_{n1}$ and $MR_{n2}$ and $H_{MR1}$ and $H_{MR2}$ represent the strength of the self-biasing magnetic fields of the respective MR elements $MR_{n1}$ and $MR_{n2}$.

By the way, in practice, contribution ratio A compared the bias magnetic field substantially applied to the MR element to the amount of the magnetic field generated by the current $i_b$ flowing through the bias conductor member 22 is different from contribution ratio B compared the bias magnetic field actually effected to itself to the amount of the magnetic field generated by the current i flowing through the MR element itself. When the closed magnetic path formed by the under magnetic substrate 23 - the magnetic layer 41 ($41_1$ and $41_2$) - the MR element - the magnetic layer 42 ($42_1$ and $42_2$) is established, the bias conductor member 22 is formed under the MR element and the laminated portion of the bias conductor member 22 with the MR element is encircled by the above closed magnetic path, the contribution ratio A can be regarded as approximately 1. On the other hand, since the MR element itself is faced to the outside through the spacing G between the magnetic layers 41 and 42, of the closed magnetic path, the contribution ratio B is made less than 1 (B<1) by the leakage magnetic flux therefrom. The practical measured result was $B/A \approx \frac{1}{2}$ to 4/5.

Meanwhile, when the MR magnetic transducer head is formed as the differential type, the magnetic fields $H_1$ and $-H_2$ to be substantially applied to both the MR elements $MR_{n1}$ and $MR_{n2}$ must satisfy the condition of $H_1 = H_2$. Thus, currents $iH_1$ and $iH_2$ for providing the magnetic fields $H_1$ and $H_2$ are as given by $$iH_1 = Aib_1 + Bi \\ iH_2 = Aib_2 - Bi \quad (2)$$

Therefore, currents $ib_1$ and $ib_2$ must be selected as $$ib_1 = iH_1 - \frac{B_i}{A} \\ ib_2 = iH_2 + \frac{B_i}{A} \quad (3)$$

Figure 14:
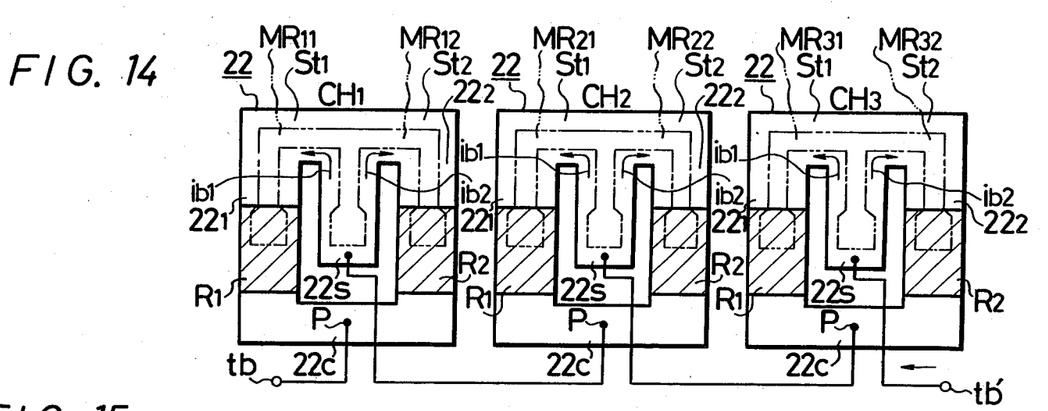
FIG. 14 is a diagram showing an example of a pattern of bias magnetic field generating means for the magnetoresistance effect element.

In order to obtain the different current values of the currents $ib_1$ and $ib_2$ flowing through paths $st_1$ and $st_2$ along the MR elements $MR_{n1}$ and $MR_{n2}$ between the leg portions $22_s$ and $22_1$, $22_2$ of the bias conductor member 22, on the basis of the above equation (3), resistance values of resistors $R_1$ and $R_2$ of each of the paths $st_1$ and $st_2$ between the center portion $22_s$ and a power supply position P at the coupled portion $22_c$ must be selected to be predetermined values. As, for example, shown in FIG. 14, the above predetermined values can be selected by interposing the resistors $R_1$ and $R_2$, each made of a resistor layer and so on having a predetermined resistance value in the leg portions $22_1$ and $22_2$. The values of the resistors $R_1$ and $R_2$ can be determined by selecting the specific resistance of the resistor layer, the thickness thereof, the width thereof and the like and further by changing each spacing between the power supply position P connected to the coupled portion $22_c$ and the leg portions $22_1$, $22_2$.

Figure 15:
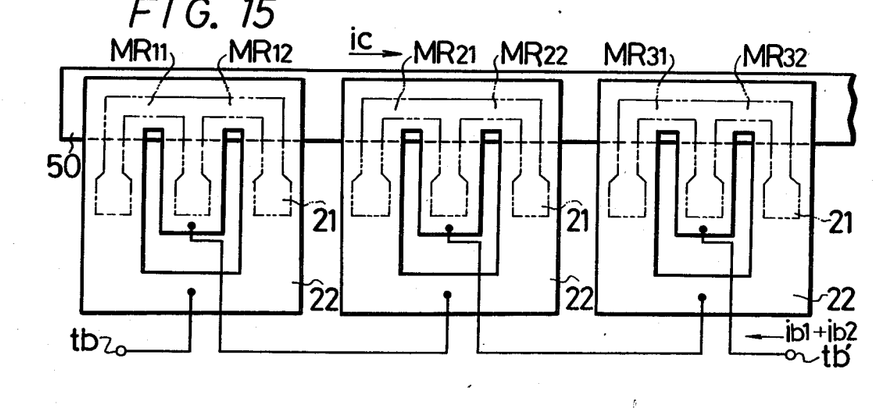
FIG. 15 is a diagram showing a pattern of a magnetic transducer head having a bias correcting conductor which can cancel out the self-biasing of the magnetoresistance effect element.
Figure 16:
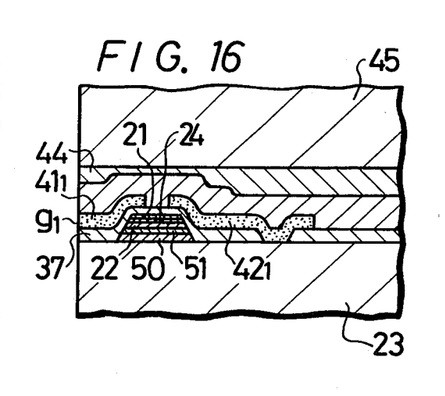
FIG. 16 is an enlarged cross-sectional view of a main part thereof, taken along a line A—A in FIG. 15.

Moreover, in some case, it is possible that the self-biasing magnetic fields of these MR elements $MR_{n1}$ and $MR_{n2}$ can be cancelled by other magnetic fields generated by supplying current to a bias correcting conductor member provided separately from the bias conductor member 22. The example of this case is as, for example, shown in FIG. 15. Regarding each channel $CH_n$, in the extended direction of the MR elements $MR_{n1}$ and $MR_{n2}$, namely, in the extended direction of the paths $st_1$ and $st_2$ in the bias conductor member 22, is located the bias correcting conductor member 50 commonly and through which a predetermined current ic opposite in polarity to that of the current i flowing through the MR element is flowed. As, for example, shown in FIG. 16, this bias correcting conductor member 50 can be formed by locating a thin film conductor member beneath the bias conductor member 22 through an insulating layer 51. As mentioned above the magnetic field generated by applying current to the bias correcting conductor member 50 can cancel the self-biasing magnetic field in each MR element.

It is needless to say that means for removing the influence by the self-biasing magnetic field of the MR element is not limited to the mode for generating the bias magnetic field according to the present invention, namely, to a so-called chain type configuration in which two terminals tb and tb' are provided and the biasing means are in parallel relative to the pair of MR elements $MR_{n1}$ and $MR_{n2}$, while they are in series between the adjoining channels.

Figure 17:
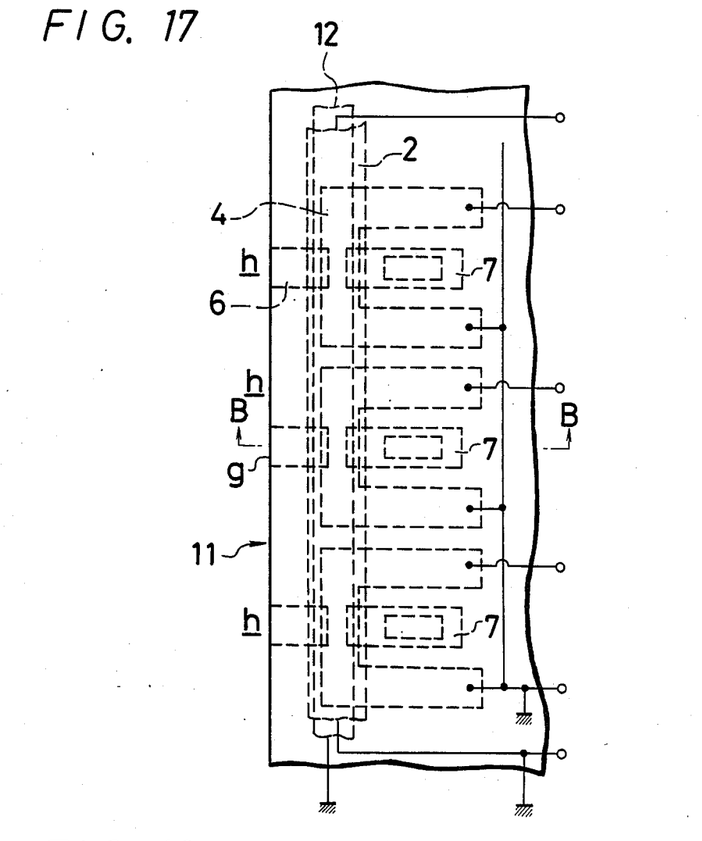
FIG. 17 is a diagram showing a pattern of a magnetic transducer head having a conductor member preventing from discharge.
Figure 18:
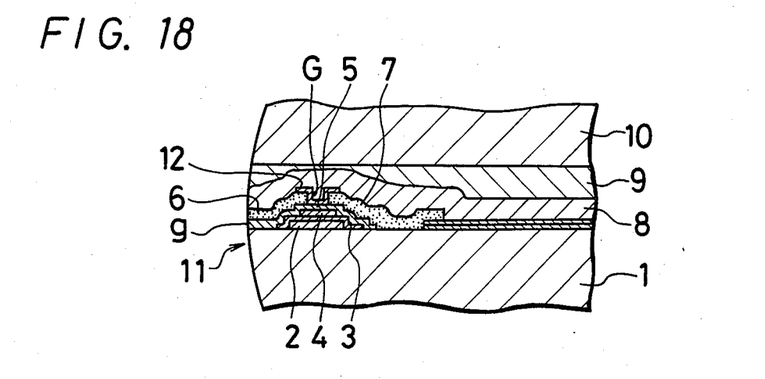
FIG. 18 is an enlarged cross-sectional view of a main part thereof, taken along a line B—B in FIG. 17.

FIGS. 17 and 18 show another embodiment of the magnetic transducer head utilizing magnetoresistance effect according to the present invention which is applied to a multichannel type MR magnetic transducer head. FIG. 17 is a schematically enlarged plan view of a main part thereof and FIG. 18 is an enlarged cross-sectional view thereof taken along a line B—B. In FIGS. 17 and 18, like parts corresponding to those of FIGS. 1 and 2 are marked with the same references and hence will not be described. In this embodiment, an electrical coupling member 12 made of non-magnetic conductive layer is deposited on the discontinuous portion G except the magnetic gap g of, for example, the closed magnetic path, namely, the spacing between both the magnetic cores 6 and 7 and in contact with the magnetic cores 6 and 7. And, the coupling member 12, the magnetic cores 6 and 7, the MR element 4 and the bias conductor member 2 are electrically connected together substantially. By way of example, under the state that one end of the bias conductor member 2 is selected to be at ground potential, one end of each MR element 4 is selected to be at ground potential and further the coupling member 12, accordingly, the magnetic cores 6 and 7 electrically connected with each other thereby are selected to be at ground potential, they are all electrically connected together substantially. Furthermore, since the insulating layer 5 on each MR element 4 is quite thin, it is possible that in order to prevent the coupling member 12 and the MR element 4 from being short-circuited on the discontinuous portion G, the coupling member 12 on the MR element 4, may be removed.

As set forth above, according to the present invention, in the MR magnetic transducer head of the differential type configuration by, for example, the constant voltage driving system in which the bias magnetic fields opposite in polarity are applied to the MR element thereby to derive the output in the differential manner, the pattern of the bias conductor member 22 for generating the bias magnetic field opposite in polarity is formed as the chain type pattern in which the patterns are formed in parallel regarding the pair of MR elements $MR_{n1}$ and $MR_{n2}$ and they are formed in series between the adjoining channels. Therefore since it is sufficient that only two terminals tb and tb' are led out among all channels, for the terminals of power source, the configuration thereof can be made simple accordingly the manufacturing process thereof becomes easy and further the track pitch can be reduced, resulting in a great advantage for the multichannel magnetic transducer head.

Moreover, since the strength of the bias magnetic fields being substantially applied to the MR elements $MR_{n1}$ and $MR_{n2}$ is made uniform, it is possible to obtain magnetic characteristic having superior linear property.

Furthermore, with the above configuration, it is possible to avoid such an accident that when the magnetic transducer head is touched with the human body and the like, the static electricity generated therefrom is discharged and destroys each of the insulating layer between the magnetic cores 6, 7, the MR element 4 and the bias conductor member 2. In consequence, it is possible to obtain the MR magnetic transducer head having high reliability.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A magnetic transducer head utilizing the magnetoresistance effect comprising:

series connected first and second magnetoresistance effect sensing elements arranged in a line configuration, both receiving a signal magnetic field derived from an common signal track on a magnetic recording medium, said series connected first and second magnetoresistance effect sensing elements each having a midregion near a midregion of the line configuration, said first magnetoresistance effect sensing element having a first end at one end of the line configuration, and said second magnetoresistance effect sensing element having a second end at an opposite end of the line configuration, said first end of said first sensing element being connected to a first voltage, and said second end of said second sensing element being connected to a second voltage so as to cause flow sensing current through said first and second sensing elements, the respective midregions of said first and second sensing elements being connected in common to an output circuit, bias conductor means having a first bias conductor portion continuous with a second bias conductor portion respectively disposed adjacent said first and second sensing elements' said first and second bias conductor portions each having a midregion generally in registry with the midregion of the line configuration, said first bias conductor portion having a first end generally in resistry with said one end of the line configuration, and said second bias conductor portion having a second end generally in registry with the opposite end of the line configuration, said bias conductor means applying a bias magnetic field of a first direction to said first sensing element and applying a bias magnetic field of a second direction to said second sensing element by applying bias current between the midregions of said first and second bias conductor portions and each of said first and second ends of said first and second bias conductor portions, such that upon the first and second magnetoresistance effect sensing elements receiving a common signal magnetic field, resistance of said first sensing element increases and resistance of said second sensing element decreases.

2. A magnetic transducer head utilizing the magnetoresistance effect comprising:

a plurality of series connected pairs of magnetoresistance effect elements arranged to receive signal magnetic fields derived from a plurality of tracks on a magnetic recording medium, each pair of magnetoresistance effect elements comprising first and second magnetoresistance effect sensing elements arranged in a line configuration, said first and second magnetoresistance effect sensing elements of each pair each having a midregion near a midregion of the line configuration, said first magnetoresistance effect sensing element of each pair having a first end at one end of the line configuration, and said second magnetoresistance effect sensing element of each pair having a second end at an opposite end of the line configuration, every first end of said first sensing elements being connected to a common first voltage, every second end of said second sensing elements being connected to a common second voltage, so as to cause flow of sensing current through each of said first and second sensing elements, the midregion of said first and second sensing elements of each pair being connected to a respective output circuit, a plurality of bias conductor means each comprising a continuous ring shaped bias conductor provided for each of said pairs of magnetoresistance effect elements, each of said ring shaped bias conductors having a first bias conductor portion and a second bias conductor portion respectively disposed adjacent each of said first and second sensing elements, said first and second bias conductor portions of each ring shaped bias conductor each having a midregion generally in registry with the midregion of the line configuration associated therewith, said first bias conductor portion of each ring shaped bias conductor having a first end generally in registry with the one end of the respective line configuration, and said second bias conductor portion of each ring shaped bias conductor having a second end generally in registry with the opposite end of the respective line configuration, said bias conductor means including means connecting the first and second ends of one of the ring shaped bias conductors with the midregions of the first and second bias conductors of another of said ring shaped bias conductors, and bias current applying means for applying bias current between the midregions of the first and second conductors of one of said ring shaped bias conductors and the first and second ends of another of said ring shaped bias conductors, such that a bias magnetic field is applied to one direction to each of said first sensing elements and is applied in a second direction to each of said second sensing elements.

3. A magnetic transducer head according to claims 1 or 2, which further comprises a bias compensation conductor provided adjacent to each of said sensing elements and supplied with current to generate a magnetic field of a direction opposite to a direction of magnetic field generated by said sensing current.

4. A magnetic transducer head according to claims 1 or 2, which further comprises a first resistor connected to each first bias conductor portion and second resistor connected to each second bias conductor portion.

* * * * *